United States Patent [19]

Astle

[11] 3,955,353

[45] May 11, 1976

[54] DIRECT CURRENT POWER CONVERTERS EMPLOYING DIGITAL TECHNIQUES USED IN ELECTRONIC TIMEKEEPING APPARATUS

[75] Inventor: Brian Astle, Princeton, N.J.
[73] Assignee: Optel Corporation, Princeton, N.J.
[22] Filed: July 10, 1974
[21] Appl. No.: 487,319

[52] U.S. Cl. .............................. 58/23 BA; 58/50 R; 321/15
[51] Int. Cl.² .......................................... G04C 3/00
[58] Field of Search ............ 58/23 BA, 50 R; 321/2, 321/15; 307/109, 110; 320/1

[56] References Cited
UNITED STATES PATENTS 3,818,484  12/1972  Nakamura ........................ 58/23 BA
3,824,447  7/1974  Kuwabara ........................ 307/110

OTHER PUBLICATIONS

Electronics, p. 95, May 25, 1970.

*Primary Examiner*—William M. Shoop
*Attorney, Agent, or Firm*—Joel F. Spivak

[57] ABSTRACT

A converter utilizes a low voltage battery to develop a higher potential by the use of capacitors which are charged sequentially according to digital waveforms provided by counting type circuits and gates. The charge transfer circuits afford a low impedance charging path and a high impedance discharge path via a series of transmission gate controlled capacitors.

The apparatus permits the conversion of low battery voltages while being completely compatible with ultra-miniature electronic systems.

15 Claims, 8 Drawing Figures

3,955,353

DIRECT CURRENT POWER CONVERTERS EMPLOYING DIGITAL TECHNIQUES USED IN ELECTRONIC TIMEKEEPING APPARATUS

BACKGROUND OF THE INVENTION

This invention relates to direct current (DC) power converters for electronic watches and more particularly to a power converter employing capacitors arranged in circuit to develop high operating potentials from a low potential source.

The power converter, generally, functions to provide a high output potential from a lower potential source such as a battery.

An example of a typical use of such a converter is in an electronic timepiece or electronic watch. Such devices are relatively new and essentially are completely electronic time-keeping devices fabricated with integrated circuits and associated displays. Such watches are ultra-miniature and provide the user with extremely accurate time indication in a wrist watch configuration. As such, the watches are energized by means of small batteries which typically provide an output voltage of about 1.5 volts. This voltage, while capable of operating and biasing certain types of integrated circuits, is usually much too low to operate the display circuits associated with such watches. For example, a low power, reliable display employs the liquid crystal. Such displays require larger operating potentials than that supplied by the battery.

The system employed in such watches utilizes a relatively high frequency crystal oscillator. The oscillator utilizing a quartz resonator is extremely stable and provides an accurate output frequency. This frequency is conventionally divided down by means of multivibrator or other types of digital counting circuits, to produce, for example, a 1 Hz signal analagous to a 1 second time interval. In turn, this signal is counted by multiples of 60 for minute indication. The minute counter provides a reference to indicate the 60 minute per hour count and hence hours. The watch circuitry displays the contents of the second, minute and hour digital counters to provide signals for energizing a digital time display. Such counters may interface with the display, by means of gating circuits as AND gates and so on to indicate the time of day in a direct reading digital format. In conjunction with the fact that displays as liquid crystals, light emitting diodes and so on operate at higher potential levels that that supplied by the battery, it is also desireable in many instances to operate the logic circuitry at higher potentials (greater than 1.5 volts) to achieve greater immunity to noise and, hence, more reliable operation in general.

Thus, to obtain such potential levels, one utilizes a power converter to raise the battery potential to a desired value.

Many techniques for doing so exist in the prior art. Certain techniques employ the use of inductors which due to their response to current changes, can provide high voltage spikes or transients, which are then rectified and filtered to produce higher potential output levels. Inductors tend to be bulky and difficult to fabricate in ultra-miniature size so as to be compatible with the requirements of the electronic watch. Inductors also produce magnetic fields and the associated transients can adversely affect the operation of the digital timekeeping circuitry employed in such a watch, as the counters, dividers, and so on.

Another commonly employed technique uses a transformer to provide a voltage step-up at a secondary winding. The primary of the transformer is supplied with an AC frequency at a given level usually derived from an oscillator or a switching circuit. The turns ratio of such transformers is such that a higher potential signal is produced at the secondary which signal is then rectified and filtered to produce the required higher level DC. These circuis present similar problems to the inductor converters in that the transformers are also bulky, the transients produce noise interference and the output is difficult to regulate because of circuit component tolerance.

However, there are a variety of circuit configurations which employ capacitors to effectuate potential conversion.

Such circuits are typically classified as voltage multipliers and basically operate as the above-described generic power converter. Basically, these circuits include doublers, triplers, or quadruplers and use capacitors to avoid the use of inductors or transformers. The circuits operate to transfer charge through diodes to provide higher operating DC potentials from a lower DC source. Examples of such circuits as well as certain of the above described converters can be had by reference to a text entitled "Radio Engineering Handbook" by Keith Henney, Fifth Edition, Chapter 17, pages 17–24, 17–25 and 17–26, a McGraw-Hill publication (1959).

As can then be verified, may typical prior art capacitor converters rely on charge transfer via diode circuits and depend upon voltage developed across the capacitors to afford charge transfers by the forward and reverse biasing of the diode.

The magnitude of the available outputs of such circuits are limited as well as the fact that an increase in the multiplication factors is associated with a reduction in efficiency of power. Hence, a quadrupler is less efficient and dissipates more power than a doubler and so on.

It is therefore an object of the present invention to provide efficient converters employing ultra-miniature capacitor elements under control of digital circuitry to develop high operating potentials at increased efficiency from a lower power source.

The converters employed are particularly suitable for use in electronic timepieces although other uses are obvious and apparent.

BRIEF DESCRIPTION OF PREFERRED EMBODIMENT

A converting apparatus is particularly adapted for use in electronic watch assemblies and provides a predetermined potential level at an output, which level is different from a source of output potential included in the watch, as, for example, a low voltage battery. The converting apparatus comprises a means for providing at least first and second waveforms synchronized one to the other, at least first and second capacitors each having a first and second terminal, one of said terminals of one of said capacitors being coupled to a point of reference potential, a plurality of transmission gates, each having an input, output and a control electrode and adapted to provide a low impedance path between said input and output electrodes upon application of said high potential to said control electrode, and means connecting said other terminals of said capacitors in circuit with said transmission gates, with said control electrodes responsive to either said first or second waveforms to sequentially charge said capacitors in accordance with said waveforms via said controlled low impedance paths of said transmission gates to cause one of said capacitors to develop said different potential level thereacross.

DETAILED DESCRIPTION OF FIGURES

Figure 1:
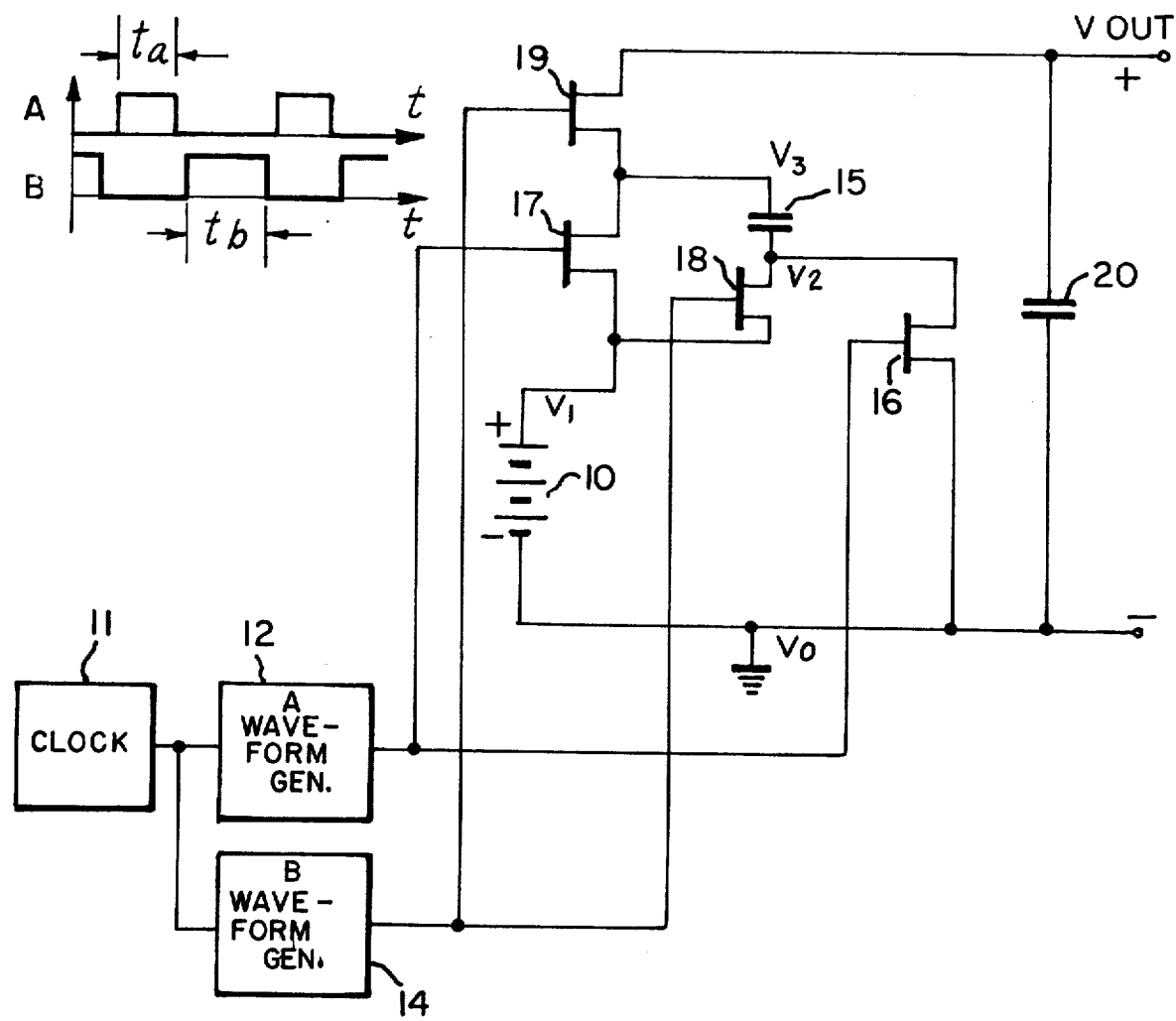
FIG. 1 is a partial block and schematic circuit diagram of a voltage doubler according to the invention including timing waveshapes.

Referring to FIG. 1, there is shown a schematic diagram of a level converter which serves to double the battery 10 voltage, $V_1$.

The description and circuitry is arranged for a negative ground designated as Vo, but it is understood that any polarity can be made available dependent upon which terminal of the battery 10 is referenced to ground potential.

Shown in the timing diagram of FIG. 1 are two pulse trains respectively designated as A and B. The pulse trains are synchronized in that the A pulse is high or positive when the B pulse train is low or negative and vice versa. Such pulse trains can be generated by a plethora of circuitry. For example, the waveforms A and B may be generated by the use of shift registers, counting chains and gates, monostable multivibrators and so on.

Thus, shown in FIG. 1 is a reference clock source 11, which may be a crystal oscillator as the one contained in an electronic watch for timekeeping purposes, an astable multivibrator or other suitable circuit.

Shown coupled to the output of the clock are waveform generators A and B, indicated as 12 and 14, respectively. While the generators 12 and 14 are shown schematically as separate modules, it is understood that the timing waveshapes A and B can, in fact, be generated by a common circuit such as a shift register, ring counter and so on, with appropriate decoding gates. Suffice it to say that generator (A) 12 provides the A waveshape, while generator (B) 14 provides the B waveshape shown in the above noted timing diagrams.

A capacitor 15 is shown with potential designations $V_2$ and $V_3$ at a first and second terminal.

The terminal designated $V_2$ is coupled to the point of reference potential Vo via a low impedance switching device 16. Device 16 is schematically shown as a MOS transistor, with a source electrode connected to $V_2$ and a drain electrode connected to Vo. It is understood that the opposite connections could be made as well as such devices as 16 can conduct current in either direction. The device 16 basically functions to provide a low impedance (almost a short circuit) between its source and drain upon application to the gate electrode of a suitable biasing potential.

It is noted that any device so operating could be used in lieu of the MOS transistor 16, such as a junction transistor, relay contact and so on.

Similarly, the terminal designated at $V_3$ of capacitor 15 is coupled to the positive battery terminal $V_1$ via another controllable switching field effect device 17. Both the gate electrodes of transistors 16 and 17 are coupled to the A waveform generator 12 and will conduct or present the low impedance state when the A waveform exhibits a high or positive potential.

The terminal $V_2$ of capacitor 15 is also coupled via a controllable switching device 18 to the positive terminal $V_1$ of the battery 10. A further switch 19 has the source to drain electrode coupled between the output (V out) and the terminal $V_3$ of the capacitor 15.

An output capacitor 20 is coupled across the V out terminal to the point of reference potential Vo.

It is noted that both the control or drain electrodes of devices 18 and 19 are responsive to the waveform provided by the B waveform generator 14, and hence, will provide a low impedance between the source, and drain electrodes upon the application of a positive potential to the drain electrodes.

Operation of Voltage Doubler Circuit of FIG. 1

During the positive transition of the A pulse designated as ta in the timing diagram, transistors 16 and 17 are forward biased, thus connecting terminal $V_2$ of capacitor 15 to ground (Vo) via transistor 16. Terminal $V_3$ of capacitor 15 is also effectively connected to the positive terminal $V_1$ of the battery 10. Hence, as one can verify during the positive transition of pulse A, the capacitor 15 is coupled across the battery 10, and hence, charges to the battery potential $V_1$. As soon as the positive transition of the A pulse terminates, the transistors 16 and 17 present a high impedance and the voltage across capacitor 15 is maintained at $V_1$. According to the timing waveshapes, the B waveform goes positive during the low transition of waveform A. This positive pulse duration tb forward biases transistors 18 and 19. This condition then causes the terminal $V_2$ of capacitor 15 to be connected to $V_1$ or the positive terminal of battery 10. The terminal $V_3$ is connected via transistor 19 to the output terminal or the positive terminal of capacitor 20.

The capacitor 15 transfers charge via device 19 to $C_{20}$ and again via transistor 18 and capacitor 15 to cause the output voltage on capacitor 20 to charge to twice $V_1$ or 2 $V_1$. Hence, at the termination of the B pulse (tb) capacitor 20 or the output voltage V out has a voltage of two times the battery supply. This voltage is continuously maintained due to the action of the waveforms A and B in forward and reverse biasing the FET transmission gating devices 16, 17, 18, and 19. It is obvious to someone skilled in the art that the capacitor 20 could equally well be connected between $V_{out}$ and $V_1$, and the output voltage be $V_{out}$ to Vo.

Figure 2:
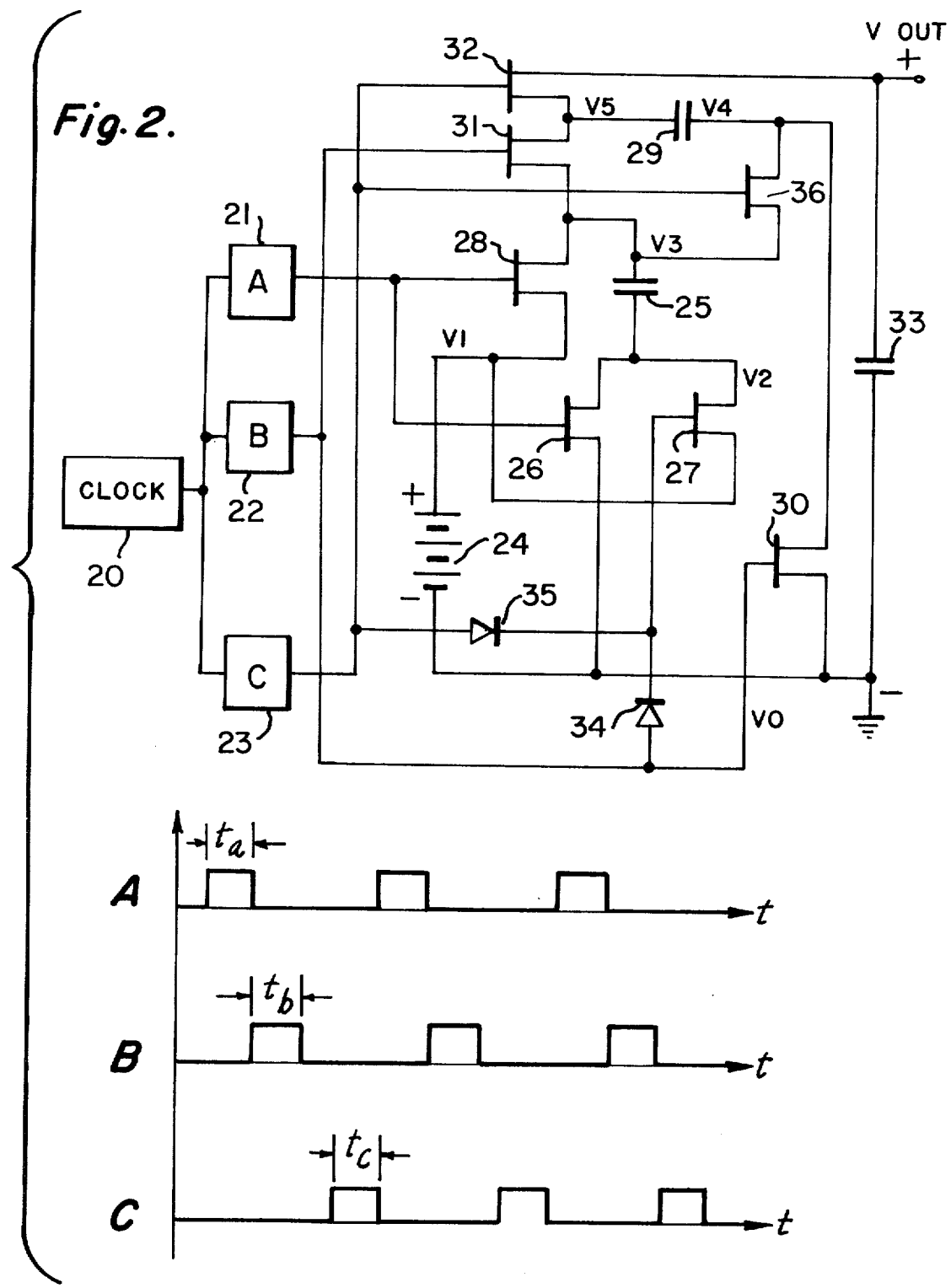
FIG. 2 is a partial block and schematic circuit diagram of a voltage quadrupler including timing waveshapes.

Theory of Operation of the Voltage Quadrupler of FIG. 2

Referring to FIG. 2, there is shown timing waveforms A, B, C with positive transitions of ta, tb and tc, respectively.

The waveforms can be generated by a shift register, a counter, multivibrators, or other well known and conventional digital circuitry.

In the associated block diagram a clock source 20 supplies the input to the A, B, and C waveform generators 21, 22, 23.

A source of potential or battery 24 is shown having its negative terminal coupled to the point of reference potential Vo. A capacitor 25 has one terminal connected to a point designated as $V_3$ and another terminal connected to a point designated at $V_2$. The $V_2$ terminal is connected via a switch 26 to the reference potential Vo and via a switch 27 to the battery potential $V_1$. The terminal $V_3$ of capacitor 25 is likewise coupled to the positive battery 24 terminal $V_1$ via a switch 28. Another capacitor 29 has a first terminal designated as $V_5$ and a second terminal designated as $V_4$. Terminal $V_4$ is connected to the point of reference potential Vo via switch 30 and to terminal $V_3$ of capacitor 25 via switch 36; while the $V_5$ terminal is connected to terminal $V_3$ of capacitor 25 via switch 31. A further switching device 32 connects the positive terminal of the output capacitor 33 to the $V_5$ terminal of capacitor 29. The negative or other terminal of capacitor 33 is coupled to the point of reference potential Vo. Also shown coupled to the gate electrode of transistor 27 are diodes 34 and 35 which act as an "OR" gate, thus permitting transistor 27 to be forward biased by the positive transition of waveforms B and C from generators 22 and 23.

Thus, as seen from the FIG. 2, transistors 26 and 28 are forward biased during the positive transition (ta) of the A waveform from generator 21. Transistors 30, 31 and 27 are forward biased during the positive transition of waveform B (tb) of generator 22. The C waveform generator 23 forward biases transistors 32, 27 and 36 during the positive transition (tc) of timing waveform C. The A, B and C waveforms do not overlap as indicated in the timing diagrams of FIG. 2 to permit efficient charge transfer without undue discharging or loading.

As indicated, during the positive transition of waveform A (ta) capacitor 25 is charged to $V_1$ or battery voltage due to the biasing of transistors 26 and 28 connecting capacitor 25 across the battery 24. Hence, capacitor 25 is charged to $V_1$. During the B waveform, transistor 27 connects terminal $V_2$ to the battery voltage $V_1$, transistor 30 connects terminal $V_4$ of capacitor 29 to ground Vo and terminal $V_5$ of capacitor 29 is connected to terminal $V_3$ of capacitor 25.

Hence, capacitor 29 charges to $2V_1$ as the charge from capacitor 25 is transferred as well as the charge from the battery via transistor 27 and capacitor 25. Hence, at the end of the B pulse (tb) capacitor 29 is charged to $2V_1$.

During the pulse (tc), the terminal $V_2$ is again connected to battery voltage $V_1$ via transistor 26. The terminal $V_4$ of capacitor 29 is connected to $V_3$ of capacitor 25 via transistor switch 36, and $V_5$ of capacitor 29 is connected to V out of the positive terminal of capacitor 33 via switch 32.

The output capacitor 33 then charges to $4V_1$ by the charge transfer from capacitor 29 of $2V_1$ and the additional transfer of $2V_1$ due to the coupling of the capacitor 33 to capacitor 25 and thence to the positive battery potential $V_1$. Again the charging cycle is repetitive and the output voltage of $4V_1$ is maintained across capacitor 33.

Figure 3:
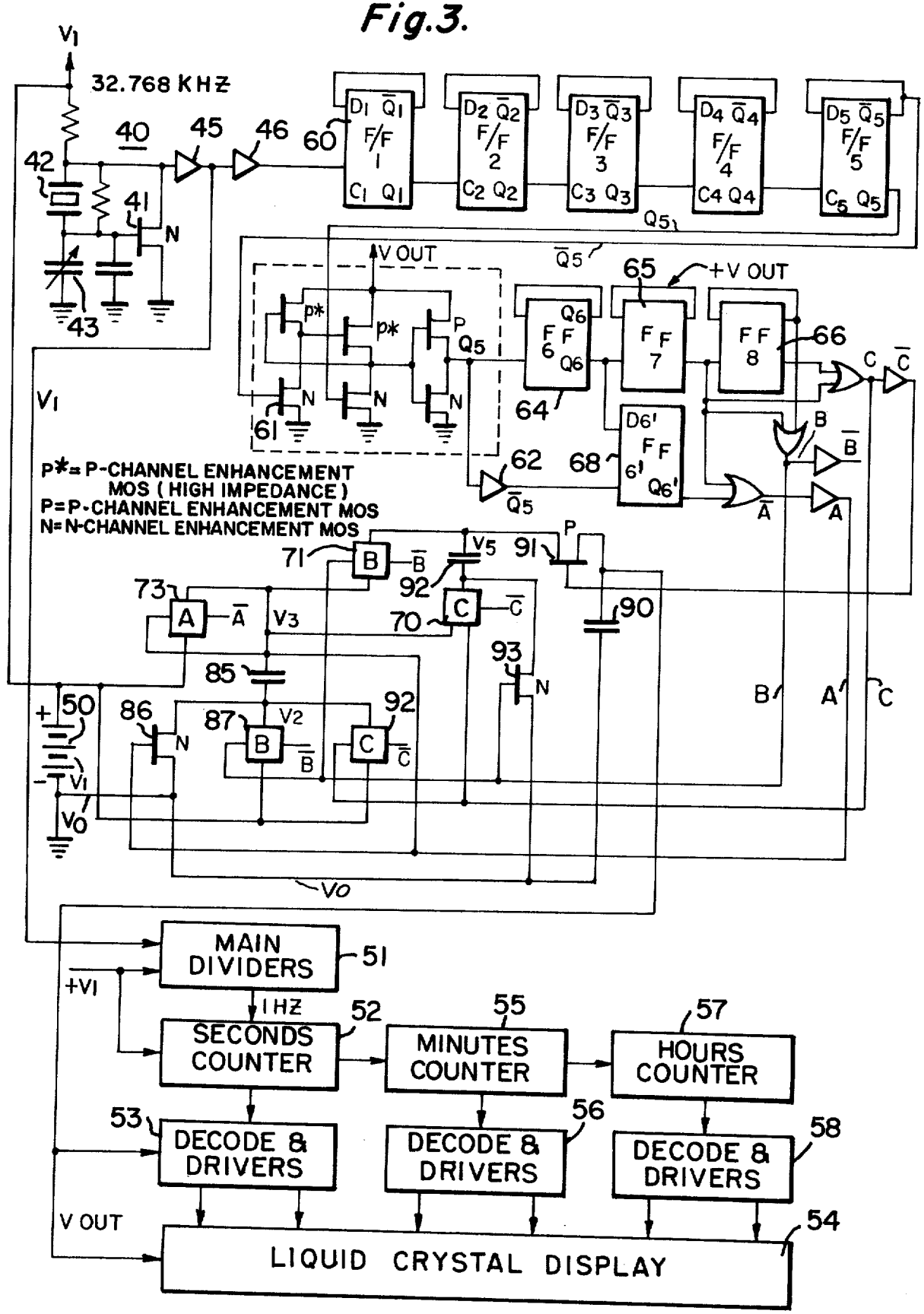
FIG. 3 is a detailed circuit diagram of a voltage converter employed in an electronic watch apparatus.

Referring to FIG. 3, there is shown a quadrupler circuit schematic according to the invention and incorporated as a power supply in an electronic watch apparatus. Before proceeding with the circuit description, it will be noted that the high voltage output (V out) is used to bias and operate the converter circuitry which as due to the nature of the components utilized is self-starting. It is also noted at the onset, that the system previously described in conjunction with FIGS. 1 and 2, is a boot-strapping scheme since the output voltage V out is used to drive the converter switching logic circuitry, a portion of which is also biased from the low voltage battery supply $V_1$.

Numeral 40 references a crystal oscillator circuit employing a n-channel enhancement MOS 41 as an amplifier. The cyrstal 42 is selected at a frequency near 32.768 KHz, which frequency is that normally employed in present day electronic timekeeping assemblies. The capacitor 43 serves as a trimmer to adjust the exact frequency. The oscillator circuit is conventional and many examples of suitable circuitry exist in the prior art. The oscillator 40 is isolated by means of two inverting amplifiers 45 and 46, which present a high input impedance to avoid undue loading of the oscillator 40 and a low output impedance for efficient driving of aditional circuitry. The oscillator 40 is biased by means of a battery supply 50, which typically is a ultra small battery operating at about 1.2 to 1.7 volts. As such, batteries as 50 are used presently to energize and power electronic watch assemblies. The low voltage is not sufficient to drive or bias certain types of displays as liquid crystals and so on. Hence, many electronic watches employ a power or voltage converter such as those described above in regard to the description of the prior art.

The oscillator's 40 output, which may be derived from either inverter 45 or 46, is directed to a divider chain 51, which may comprise cascaded multivibrators to provide a timekeeping signal at, for example, a 1 Hz duration. It is noted that the frequency of 32,768 Hz is a binary number and hence, cascaded multivibrators can provide the 1 Hz signal without employing complicated feedback or resetting techniques.

The 1 Hz signal has a 1 second rate which is extremely accurate as being derived from the crystal oscillator 40.

This signal is coupled to a SECONDS counter 52, which counts and stores sixty one second transitions and commences from zero upon completion of a count of sixty. The output of the seconds counter 52 is decoded to decimal format by means of decoder and driver circuits 53 and is used to activate the suitable digits indicating seconds of a liquid crystal display 54.

The transition pulse indicating a count of sixty by the second counter is coupled to a minute counter 55, which also counts and stores sixty such transition pulses to thence decode and display minutes via decoder and drivers 56. In a similar manner an hour counter 57 in conjunction with an hour decode and display driver 58, serves to monitor and display hours.

The liquid crystal display as well as the driver circuitry requires larger voltages than that supplied by the battery 50. Therefore, a converter is necessary to supply the voltage V out, which may be four or more times higher than $V_1$ or the battery voltage 50.

For examples of typical liquid crystal displays and driving arrangements, reference is had to U.S. Pat. No. 3,744,049 entitled LIQUID CRYSTAL DRIVING AND SWITCHING APPARATUS UTILIZING MULTIVIBRATORS AND BIDIRECTIONAL SWITCHES by N. A. Luce, issued on July 3, 1973 and assigned to Optel Corporation, the assignee herein.

The crystal oscillator 40 frequency is also used to derive the waveforms as A, B, and C of FIG. 2, for example, for the converter circuitry. Thus shown having a $C_1$ (clock) input coupled to the output of inverter amplifier 46 is a flip-flop or multivibrator 60 further designated as F/F1. The flip-flop 60 has a normal output $Q_1$ and an inverted output $\overline{Q}_1$. The particular configuration indicated for flip-flop 60 is referenced to in the art as a D type circuit. The circuit operates such that the logic level present at the D input ($D_1$ for F/F1, 60) is transferred to the Q output ($Q_1$ for F/F1, 60) during a positive clock transition. D flip-flops are well-known and are provided in COS/MOS circuit chips. For a clearer explanation of such circuits reference may be had to a publication entitled COS/MOS INTEGRATED CIRCUITS MANUAL by RCA - Solid State Division, Somerville, New Jersey, copyrighted 1971, on pages 20 and 21. It is noted that any other type of flip-flop can be used as well, depending upon power requirements aand operating potentials.

The D type flip-flops F/F1 to F/F5 function to divide the oscilltor 40 frequency by a factor of thirty-two. Each stage is a D flip-flop 60 and operates accordingly. It is also noted that the chain of flip-flops, as shown, F/F1 to F/F5, serves to divide the clock or oscillator frequency by, for example, thirty-two. Hence, one could actually use the main dividers 51 to obtain the required waveshapes or alternatively, one could utilize the output signal of F/F5 to obtain a frequency output signal of 1024 Hz which then may be divided by a 10 stage binary counter to produce an output of 1 Hz. Thus, it should be apparent that the divider shown can also be used in the previously described clock circuitry.

Figure 4:
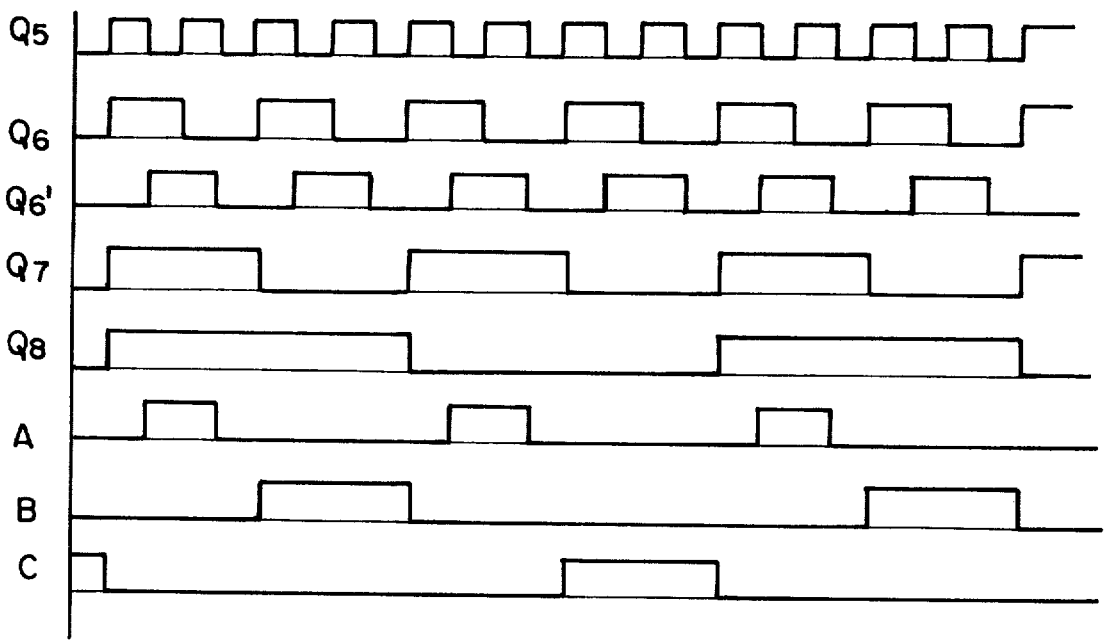
FIG. 4 is a series of timing waveshapes useful in explaining the operation of the circuity of FIG. 3.

The outputs of F/F5 are designated as $Q_5$ and $\overline{Q}_5$ and the waveform is shown in FIG. 4 as $Q_5$, the $\overline{Q}_5$ is the inverted version of the waveform $Q_5$ of FIG. 4.

The oscillator 40, as well as the flip-flops F/F1 to F/F5 are all biased and operate from the battery 50 voltage $V_1$.

The output waveforms of F/F5 are applied to a MOS level converter circuit comprising stacked pairs of p-channel enhancement MOS devices with n-channel enhancement devices. The level converter 61 operates from the V out voltage which is the output of the quadrupler circuit, and hence, the above-described bootstrapping operation is so implemented.

The level converter may also be obtained as an integrated chip and the above-referenced RCA publication contains examples of suitable circuits on pages 59 to 69. The output of the level converter is the $Q_5$ waveform shown in FIG. 4 at a higher voltage level than the waveform available at the $Q_5$ output of F/F5. The higher potential $Q_5$ signal from the level converter 61 is inverted by inverter to obtain the $\overline{Q}_5$ signal. These signals are used to control the operation of an additional counter chain comprising D type flip-flops F/F6 to F/F8 and designated as 64, 65 and 66, respectively. These flip-flops are the same configuration as F/F1 to F/F5, but operate at the higher voltage level from the converter +V out.

An additional D flip-flop 68 has its D input coupled to the $Q_6$ output of flip-flop 64 and is clock is C input supplied by the inverter 62.

The outputs of the stages 64, 65, and 68 are shown in FIG. 4 as $Q_6$, $Q_6{}^1$, $Q_7$ and $Q_8$. These waveforms are operated on by typical AND and OR gate logic assemblies to provide the waveforms A, B, and C of FIG. 4.

These waveforms do not overlap as indicated in regard to the description of FIG. 2 and permit the charging and discharging of the converter capacitors by the abovedescribed techniques.

It is noted that FIG. 3 shows both the inverted and noninverted outputs for waveforms A, B, and C of FIG. 4, namely $\overline{A}$, $\overline{B}$, and $\overline{C}$.

In describing the operation of the doubler and quadrupler circuits of FIG. 1 and FIG. 2, it was indicated that the active transmission devices could be bidirectional FET devices to allow charging and discharging of the capacitors. It was also indicated that the switching devices could, in fact, be a relay contact as a single pole, single throw switch. FIG. 3 shows a series of modules as 70, 71 and 73, each is designated respectively as C, B, and A. They are transmission gates which perform the exact functions of transistors as 16 and 18 of FIG. 1 or 26 and 27 of FIG. 2.

Basically, a transmission gate such as 70, 71 or 73 can be implemented with COS/MOS logic circuitry. (See RCA reference, pages 17 and 18), and is, in fact, a close approximation to a single pole, single throw switch. It is formed by the parallel connection of a p-type and an n-type device. The gate electrode of one device is activated by the non-inverted clock and the gate electrode of the other device by the inverted clock as A and $\overline{A}$. The source and drain electrodes are connected together to provide the low impedance path required to reliably charge and discharge the capacitors as indicated in FIG. 2. The operation of the transmission gate is extremely simple and will be explained in regard to FIG. 5.

Figure 5A:
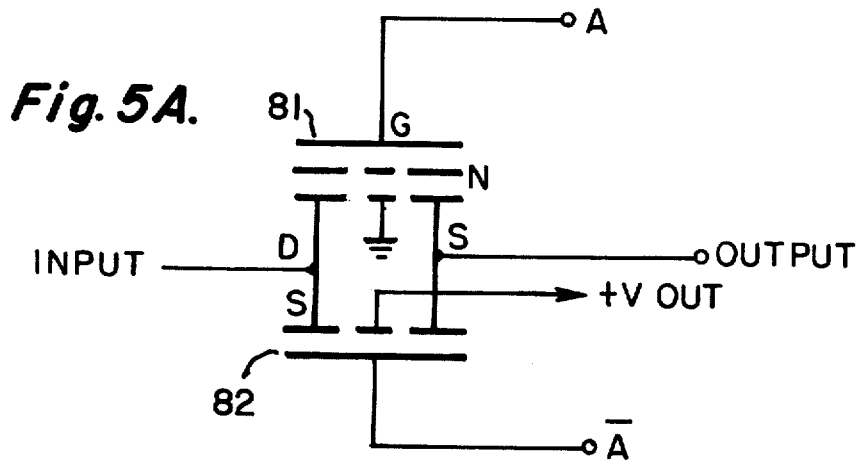
FIGS. 5A and 5B are a schematic circuit diagram and a symbol diagram of a transmission gate useful in practicing the invention.
Figure 5B:
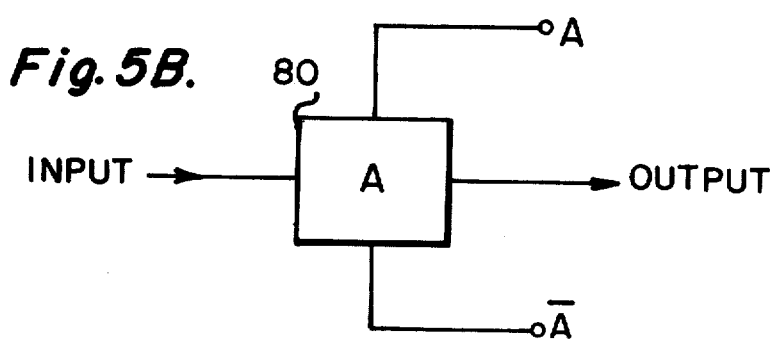

FIG. 5B shows the schematic used in FIG. 3 for a transmission gate. Hence, the gate 80 of FIG. 5B is a single pole electronic circuit which conducts or presents a low impedance path between the input and output when the A waveform exhibits a high potential level.

FIG. 5A shows the circuit. A first n-type MOS 81 has its drain connected to the souce of a p-type MOS device 82. The source of 81 is likewise connected to the drain 82. The source and drain connections form the input terminal and the opposite connections form the output terminal. The gate of device 81 is coupled to an A waveform source while the gate of the p-device 82 is coupled to an $\overline{A}$ waveform source. Biasing is applied as shown by +V out to the substrate connection of the p-device.

When the A clock is high, the $\overline{A}$ is low. Thus, both transistors 82 and 81 are conducting and there is an extremely low impedance path between the input and output terminals. When the A clock reverses polarity, both transistors are biased off, and hence, there is an extremely high impedance between input and output.

The circuit shown in FIG. 5A is a bilateral as the drain and source electrodes are interchangeable. The gate shown in FIG. 5A is faster in operation than a single n-channel transmission gate.

Again, referring to FIG. 3, it can then be ascertained that the configuration shown is, in fact, a quadrupler as the one described in FIG. 2. The table below indicates corresponding parts and the operation is otherwise identical.

TABLE

| FIG. 2 Component | FIG. 3 Counterpart |
| --- | --- |
| Battery 24 | Battery 50 |
| Capacitor 25 | Capacitor 85 |

TABLE-continued

| FIG. 2 Component | FIG. 3 Counterpart |
| --- | --- |
| Transmission Gate 27 | Transmission Gate 87 |
| Transmission Gate 26 | Transmission Gate 86 |
| Transmission Gate 28 | Transmission Gate 73 |
| Transmission Gate 36 | Transmission Gate 70 |
| Transmisison Gate 30 | Transmission Gate 93 |
| Transmisison Gate 27 (OR) | Transmission Gate 92 |
| Transmission Gate 31 | Transmission Gate 71 |
| Transmission Gate 32 | Transmission Gate 91 |
| Capacitor 29 | Capacitor 92 |
| Capacitor 33 | Capacitor 90 |
| $V_a, V_1, V_2, V_3, V_4, V_5, V$ out | $V_a, V_1, V_2, V_3, V_4, V_5, V$ out |

The circuit of FIG. 3 was constructed using $C_{85} = C_{92} = C_{90} = 0.047$ microfarads with a battery voltage $V_1$ of 2.5 volts, the output was 6.66 volts.

Increasing the size of the capacitors indicated above to 0.47 microfarads gave an output of 9.04 volts. The logic circuits as well as the inverters, flip-flops and gates were implemented with RCA COS/MOS circuits available as the 4000 series and sold by the RCA Solid State Division of Somerville, New Jersey 08876.

The 0.047 microfarads capacitors used are approximately 0.050 inches wide, 0.050 inches high, and 0.080 inches long and are generally designated as chip capacitors. The circuitry shown in FIG. 3 supplied in excess of 1 microamp at the voltage of 9.04 volts and operated between 90 and 95 percent efficiency.

The circuit was self-starting in that substrate leakage in the integrated circuits causes a voltage to develop across capacitor 90. Once the voltage appears, the circuits become biased and the voltage across the capacitor 90 builds up until the quiescent value is achieved.

Converter for Providing Rational Fractional Voltages

Figure 6:
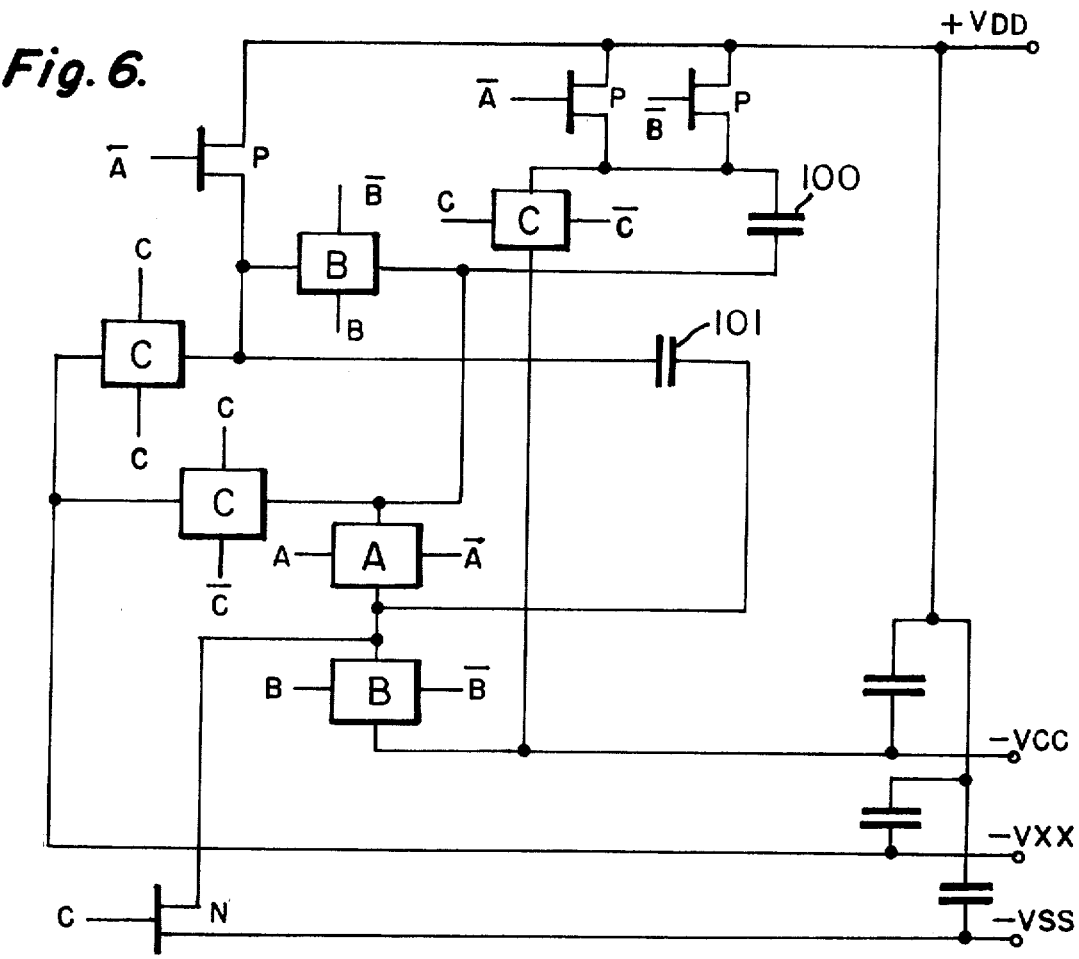
FIG. 6 is a simple block diagram of an alternate embodiment of a converter.

FIG. 6 shows another embodiment of an aspect of this invention. The transmission gates designated as A, B, and C are as those shown in FIG. 3 and FIG. 5B and the A, B, and C waveforms are those shown in FIGS. 2 and 3, the $\overline{A}$, $\overline{B}$, and $\overline{C}$ being the non-inverted ad the A, B, and C being the inverted or one hundred and eighty degrees out of phase waveforms.

From the circuit shown in FIG. 6, it can be ascertained that during the positive level of the A pulse capacitos 100 and 101 are connected in parallel and therefore share charge. During the B pulse, capacitors 100 and 101 ae connected in series between $+V_{DD}$ and $-V_{cc}$. During the C pulse, capacitor 100 is connected between $-V_{cc}$ and $-V_{xx}$ and capacitor 101 is connected between $-V_{xx}$ and $-V_{ss}$.

If one applies a voltage between $+V_{DD}$ and $-V_{ss}$, the circuitry shown under control of the A, B, and C waveforms generates ½ and ¼ of the voltage. A voltage applied between $+V_{DD}$ and $-V_{cc}$ generates ½ and twice the voltage. $V_{DD}$ is reference potential and is normally 0 volts. Hence, for a voltage of $-1.6$ volts applied between $V_{DD}$ and $V_{cc}$, $V_{xx}$ would be at $-2.4$ volts and $V_{ss}$ at $-3.2$ volts.

Converter for Developing Arbitrary Fractional Voltages

Figure 7:
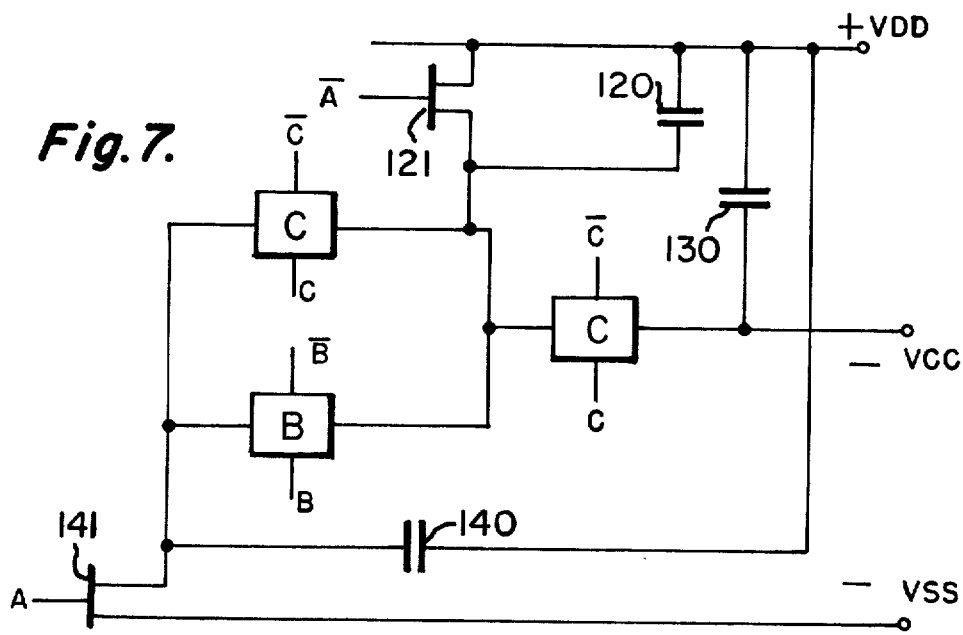
FIG. 7 is a block diagram of an arbitrary fractional converter according to the invention.

Referring to FIG. 7, $+V_{DD}$ is a point of reference potential. The $-V_{ss}$ is the battery source line and has a value equal to the battery value $V_1$. The timing waveforms A, B, and C are again identical with those shown in FIG. 2 or FIG. 3 and the transmission gates as indicated either by the block diagram or the semiconductor symbology are those types above-described.

The operation is as follows:

During the A pulse, capacitor 120 is accessed by means of the transmission gate 121, and hence, is discharged or charged to zero volts. Capacitor 140 is connected to $-V_{ss}$ of $V_1$ via switch 141 and charges to $-V_1$. During the B pulse, capacitor 120 is in parallel with capacitor 140 and capacitor 120 charges to: $-C_{140}V(C_{120}+C_{140})$. During the C pulse, capacitor 130 is in parallel with $C_{120}$ and $C_{140}$, and hence, changes to:

$$\frac{-C_{140}V_{ss}}{C_{140}+C_{120}}.$$

Hence, as one can ascertain, the value of $C_{140}$ and $C_{120}$ determine the output voltage $-V_{cc}$. This, of course, can be of either polarity (positive or negative) depending upon the battery potential as applied between $-V_{ss}$ and $+V_{DD}$. If $C_{140} = C_{120}$ then:

$$V_{cc} = \frac{-V_{ss}}{2} = \frac{-V_1}{2}.$$

Thus, the above specification describes a variety of novel converters relying on the transfer of charge via high efficiency transmission gates which are controlled by digital waveforms generated by conventional digital circuitry.

It will be well understood by those skilled in the art how modifications and additional circuitry could be implemented using the above-described concepts.

I claim:

1. In an electronic watch assembly of the type employing an accurate source of oscillations for providing a timekeeping signal, said watch including a low voltage battery for energizing circuitry included in said watch, the combination therewith of apparatus for converting said low voltage battery potential to a higher voltage level, comprising:
   a. means coupled to said accurate source of oscillations for providing at least first and second waveforms synchronized one to the other, said waveforms characterized in that said first one is at a positive level when said second one is negative and vice versa, said waveforms having no condition where both can be positive or both can be negative, as the waveforms do not overlap,
   b. a first capacitor having a first and second terminal,
   c. a second capacitor having a first and second terminal with said second terminal coupled to a point of reference potential,
   d. a plurality of transmission gates each having an input and output terminal and capable of operating in a low impedance state upon application of a predetermined potential level to a control electrode associated with each of said gates,
   e. means coupling one of said terminals of said first capacitor to an output terminal of a first one of said transmission gates and said other terminal to an output of another of said transmission gates, the input of said first transmission gate being coupled to a terminal of said low voltage battery and the input of said another gate being coupled to a point of reference potential, and f. means coupling said first terminal of said second capacitor to an output of still another transmission gate with said input of said gate coupled to a terminal of said first capacitor, said control electrodes of said gates being responsive to a selected one of said first and second waveforms to energize said gates in a predetermined sequence whereby said low battery voltage charges said capacitors via said gates in a manner to provide a different potential then said battery potential across said second capacitor, said second capacitor only being coupled to said battery during said second waveform and only when said first capacitor is not so coupled, whereby said first and second capacitors are never in parallel, and g. means for transferring said charge across said first and second capacitors to a third output capacitor.

2. The converting apparatus according to claim 1, wherein said transmission gates comprise at least one field effect transistor having a source output terminal, a drain input terminal, and a gate control electrode.

3. The converting apparatus according to claim 2, wherein said field effect device is bilateral.

4. The converting apparatus according to claim 1, wherein said means coupled to said accurate source of oscillations comprise a plurality of cascaded multivibrators for dividing said accurate source by a given integer, and gating means coupled to said multivibrators for providing said first and second waveforms at respective ouputs of gating means.

5. The apparatus according to claim 4, wherein said multivibrators are flip-flops employing MOS devices.

6. The apparatus according to claim 1, wherein said potential across said second capacitor is greater than said battery potential.

7. The apparatus according to claim 1, wherein said potential across said second capacitor is a rational fraction of said battery potential.

8. The apparatus according to claim 1, wherein said potential across said second capacitor is an arbitrary fraction of said battery potential.

9. The apparatus according to claim 1, wherein said potential across said second capacitor is relatively equal to said battery potential multiplied by the integer 2n, where n is greater than 1.

10. The apparatus according to claim 1, wherein said first terminal of said second capacitor is coupled to said means coupled to said accurate source for energizing the same with said potential level across said capacitor.

11. Converting apparatus for providing a predetermined potential level at an output, which level is different from a source of operating potential, comprising:

a. means for providing at least first and second waveforms synchronized one to the other, said waveforms characterized in that said first one is at a positive level when said second one is negative and vice versa, said waveforms having no condition where both can be positive or both can be negative, as the waveforms do not overlap, b. at least first and second capacitors, each having a first and second terminal, one of said terminals of one of said capacitors being coupled to a point of reference potential, c. a plurality of transmission gates, each having an input, output, and a control electrode and adapted to provide a low impedance path between said input and output electrodes upon application of said high potential to said control electrode, d. means connecting said other terminals of said capacitors in circuit with said transmission gates, with said control electrodes responsive to either said first or second waveforms to sequentially charge said capacitors in accordance with said waveforms via said controlled low impedance paths of said transmission gates to cause one of said capacitors to develop said different potential level thereacross, wherein, due to said waveforms, one of said capacitors is only coupled to said battery when the other of said capacitors is not and said first and second capacitors are never in parallel, and e. means for transferring said charge across said first and second capictors to a third output capacitor.

12. The converting apparatus according to claim 11, wherein said means for providing at least said first and second waveforms comprises a crystal oscillator capable of providing a relatively stable output signal of a given frequency, and counting means coupled to said oscillator for providing a series of digital waveshapes, decoding means responsive to said waveshapes for providing at an output said first and second waveforms.

13. The converting apparatus according to claim 11, wherein said transmission gates are parallel $p$ channel, $n$ channel MOS devices.

14. The converting apparatus according to claim 11, wherein said level different from said operating potential is 2n times the same, where n is an integer greater than 1.

15. The converting apparatus according to claim 12, wherein said crystal oscillator is that included as a time-keeping source in an electronic watch apparatus.

* * * * *